June 30, 1959 W. I. L. WU 2,892,944
SIGNAL GENERATOR
Filed April 24, 1957
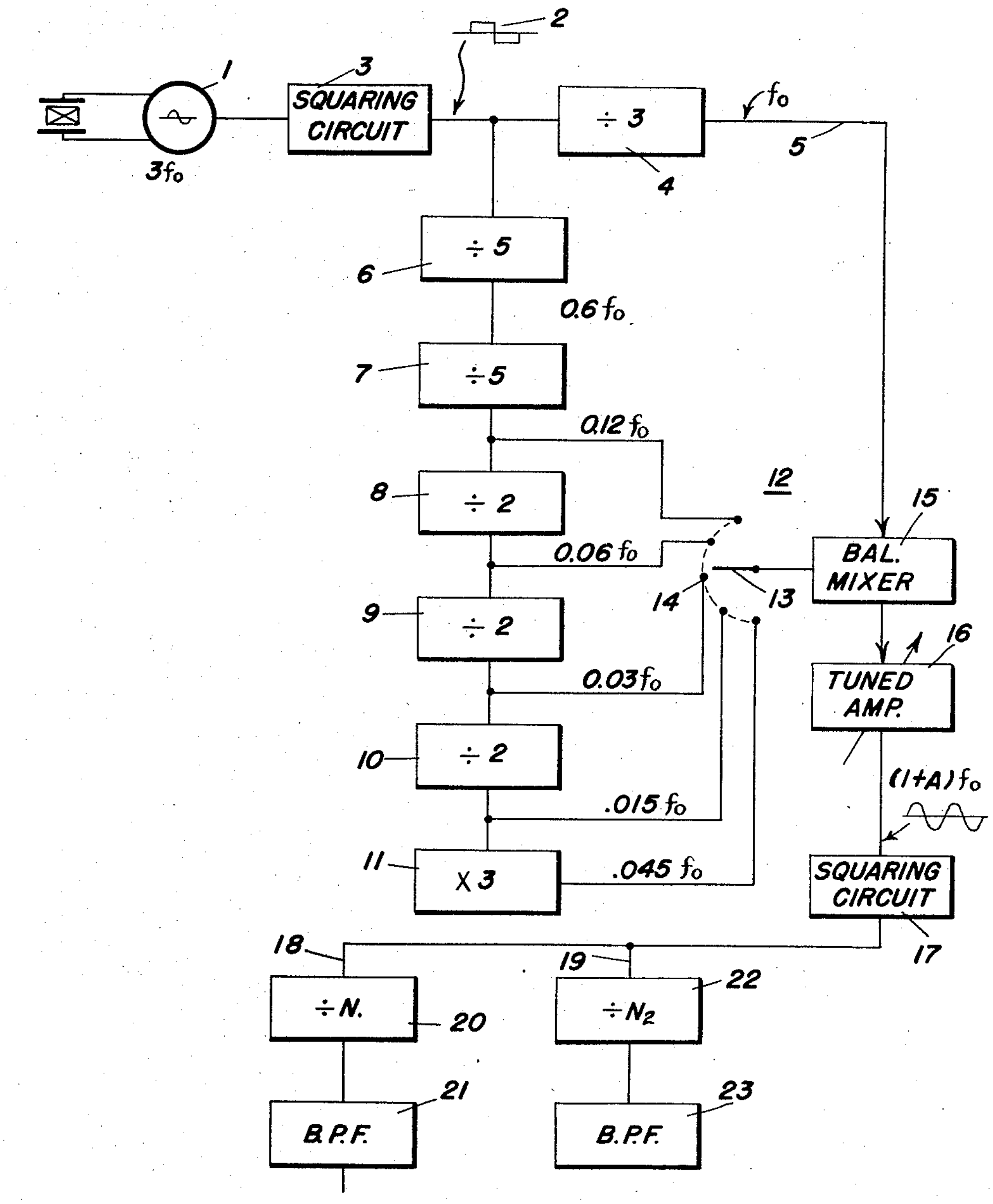
INVENTOR
WILLIAM I. L. WU
BY Hurvitz & Rose
ATTORNEYS United States Patent Office 2,892,944

Patented June 30, 1959

2,892,944

SIGNAL GENERATOR

William I. L. Wu, Forest Hills, N.Y., assignor to Panoramic Radio Products, Inc., Mount Vernon, N.Y., a corporation Application April 24, 1957, Serial No. 654,731

10 Claims. (Cl. 331—37)

The present invention relates generally to oscillators and more particularly to signal generators which generate at will any one of a plurality of frequencies, each displaced from a reference frequency by a different specified fractional part of the reference frequency.

The problem exists of accurately generating a plurality of frequencies which are displaced from one another by a predetermined percentage of some given frequency, which precisely retain their frequency separations over long time periods, and which are of pure sinusoidal wave form. Sinusoidal signal generators of this kind are applicable in calibrating frequency sensitive circuit components, such as frequency discriminators, and the like. It has been found that the accuracy and purity of wave form required for certain applications of multiple frequency generators are not attainable by the employment of separate stable oscillators without complexity, even if these are crystal controlled. It has proved desirable to derive the various required frequencies from a single stable oscillator, employing cascaded count-down binary divider chains to generate rectangular wave forms, to intermix various of the rectangular wave forms, and to select one harmonic frequency from the conversion products of mixing. In this way a precise relationship is maintained among the various available output frequencies of the system, and a fractional variation of any one frequency is accompanied by corresponding fractional variations of the others.

The signals generated by the count-down divider chains are of rectangular wave shape, and are just as stable frequency-wise, or a percentage basis, as the master frequency from which they are derived, while interference is reduced, because the count-down process involves averaging the periods of a number of cycles of the master frequency. For example, if count-down by a factor of 100 is accomplished, the counted-down frequency is determined as 1% of the average value of the original frequency over each 100 cycles of the latter. Frequency jitter of the output of the original stable oscillator, which represents undesired sideband components, is thus minimized.

To obtain frequencies which differ from a master frequency by some small accurately fixed percentage of the latter, the master frequency converted to rectangular wave form is mixed in a balanced mixer with any selected one of a plurality of counted-down rectangular wave modulating frequencies, and one side band or conversion product is selected by means of a narrow band filter. The harmonics inherent in the rectangular waves which result from the count-down process fall outside the acceptance band of the filter, by a large margin, since the first of these is a second harmonic. The output signal derivable from the filter is then a pure and highly stable sinusoidal wave. By further count-down frequency division of the selected side-bands, followed by further narrow band filtering, still further sets of frequencies may be generated, which retain the percentage separations of the original sets.

It is, accordingly, a broad object of the present invention to provide a signal generator system for generating at will any one of a plurality of output frequencies, having wave forms of extreme purity, precise frequency values, and predetermined percentage frequency separations from a base frequency.

It is another object of the present invention to provide a system of generating sinusoidal signals of pure wave form by frequency dividing a base frequency by means of a binary counting process, which provides a rectangular wave form as the product of the division process, and filtering from the rectangular wave form a single harmonic frequency.

A further object of the present invention resides in the provision of a multiple frequency generator, including means for dividing a base frequency in a number of cascaded steps by a count-down process to provide a plurality of square wave subdivided frequencies, mixing any selected subdivided frequency with the base frequency to provide conversion products including multiple harmonic frequencies, and selecting one of the latter for further subdivision.

It is still another object of the invention to provide a system of generating sinusoidal waves of pure wave form, and of any one of a plurality of frequencies selectable at will, comprising a source of stable sinusoidal waves, means for deriving from the latter, by count-down, rectangular waves of a base frequency and further rectangular waves of frequencies separated from the base frequency by specified percentages, mixing the rectangular waves of base frequency with any selected one of the further rectangular waves, and selecting from the products of mixing one desired frequency.

A system for generating a sinusoidal wave of pure wave form, including devices for generating two rectangular wave forms of different frequency by a count-down process, mixing the two rectangular waves to provide conversion products, and selecting one conversion product by means of a narrow band pass filter.

The above and still further objects, features and advantages of the present invention will become apparent upon consideration of the following detailed description of one specific embodiment thereof, especially when taken in conjunction with the accompanying drawings, wherein the single figure of the drawings is a block diagram of a system in accordance with the invention.

Referring now more particularly to the accompanying drawings, the reference numeral 1 denotes a crystal oscillator, which is highly stable, and generates a sinusoidal wave of frequency $3f_0$. The output of oscillator 1 is shaped to rectangular form 2 in a squaring circuit 3, and its frequency then divided by a count-down binary or multivibrator chain 4, by a factor of 3. The output of counter 4 consists of rectangular waves at frequency $f_0$, which appear on a lead 5.

The rectangular wave 2 is further applied to count-down multivibrator, digital or binary dividers, bearing reference numerals 6, 7, 8, 9, 10, and all in cascade, these having successive exemplary division factors 5, 5, 2, 2, 2, respectively. The cascade of dividers is followed by a multiplier, 11, having a multiplication factor 3. All the dividers and multipliers specified operate as digital computers on the binary principle, in order to assure complete freedom from computing errors, i.e., so that multiplications and divisions will be accomplished with 100% accuracy. At the output of the second divider 7, the frequency of wave 2 has been divided by a factor of $5\times5=25$ so that the frequency here present is 4% of that of wave 2 or $0.12f_0$. The following divider 8, provides an output of $.06f_0$; the following divider 9, an output of $.03f_0$; the following divider 10, an output of $.015f_0$; and the multiplier, 11, an output of $.045f_0$.

A switch 12 is provided, having a movable arm 13 and a series of stationary contacts 14. The latter are connected to the outputs of the several dividers 7–11, inclusive, while the movable arm is connected to a balanced input circuit of a balanced mixer 15. A further input for mixer 15 derives from divider 4, and corresponds with a square wave of reference frequency $f_0$. The output of mixer 15 is connected to a tunable amplifier or output band-pass filter 16, which is tunable to pass any one frequency in the band $f_0 \pm X$, where X is any output frequency derived at switch 12, i.e., any of exemplary frequency values $0.015f_0$, $0.03f_0$, $0.045f_0$, $0.06f_0$, and $0.12f_0$. The mixer 15 is a balanced mixer, so that the frequencies $Xf_0$, or harmonics thereof, constituting Fourier components of the square wave shapes input to the mixer 15 from switch 12 are not present in the output of the mixer. The conversion products $f_0 \pm X$ are present. The tunable band-pass amplifier or filter 16 includes a manual tuning device or element such that a frequency $(1+A)f_0$ where $A=X/f_0$, is the only frequency passed, X having one of the exemplary values above specified. The harmonic components present in the rectangular wave signals are not passed by the filter 16, so that the output of filter 16 is a sinusoidal wave of frequency $(1+A)f_0$.

The sinusoidal wave of frequency $(1+A)f_0$ is amplified and limited, in a squaring circuit 17, and the rectangular wave output so formed may be divided in any number of parallel channels, 18 and 19, for example. The channel 18 may include a divider chain 20, having a division factor $N_1$, followed by a selective filter 21, which selects one frequency only from the square wave output of divider chain 20. The channel 19 may include a divider chain 22, having a division factor $N_2$, followed by a selective filter 23 which selects one frequency only from the rectangular wave output of divider chain 22. The filtering problem is not severe since the frequencies present are S, 2S, 3S, 4S, 5S . . . , S being the rectangular wave frequency, so that the frequency separation between the desired frequency S and the next adjacent harmonic is S. At the same time frequency jitter which may have been present in the wave prior to frequency division, and which corresponds with undesired side band frequencies, is reduced by the process of counting down. The band-pass filter 21 may, therefore, be designed to pass any one of the frequencies $$\frac{(1+A)f_0}{N}$$

In a practical embodiment of the present invention, a crystal controlled oscillator 1 is employed, having a frequency of 234.6 kc., selected for example only. The frequency $f_0$ is therefore 78.2 kc. The frequencies derivable from the dividers 7, 8, 9, 10 and the multiplier 11 (X) are respectively $0.6f_0$, $0.12f_0$, $0.06f_0$, $0.03f_0$, $0.015f_0$, $0.045f_0$. The frequencies derivable from the tuned amplifier 16 are then $f_0 \pm X$. Eleven outputs are made available in this manner. Each of these eleven outputs may then be divided, in channels such as 18, 19, to provide separate arrays of frequencies, each array so generated having the same percentage separations among its component frequencies. Suitable division factors for dividers 20 and 22, are 46 and 34, respectively, to provide mean values of output frequency arrays equal to 1.7 kc. and 2.3 kc. Identical percentage frequency deviations from the specified mean values may then be accomplished by manipulation of switch 12 and filter 16.

While I have described and illustrated one specific embodiment of my invention, it will be clear that variations of the general arrangement and of the details of construction which are specifically illustrated and described may be resorted to without departing from the true spirit and scope of the invention as defined in the appended claims.

What I claim is:

1. In combination, a frequency stable source of oscillations, means for counting down the frequency of said oscillations comprising a plurality of more than two count-down dividers, each of said dividers having an output circuit, means including a heterodyne mixer for combining signals in certain of said output circuits at will, and a band filter for passing only one conversion product of those generated by said mixer.

2. A system for deriving a plurality of stable pure sinusoidal wave forms of related frequencies from a single oscillator, comprising first means for generating a first rectangular wave carrier of frequency $f_0$ in response to said oscillator, said means including a digital frequency divider including binary count down elements, further means for generating a plurality of further rectangular wave signals each of a different frequency, $Xf_0$, where $Xf_0$ is a fundamental frequency component and X is a division factor, means for at will mixing said first rectangular wave carrier with one of said further rectangular wave signals to derive conversion products including $f_0 \pm Xf_0$, and means for selecting one of said conversion products at will.

3. The combination in accordance with claim 2, wherein is further provided means for counting down the selected conversion products comprising a binary count down device and a narrow band-pass filter connected in cascade, said means for counting down arranged to provide a rectangular wave output, said narrow band-pass filter arranged to pass only one frequency component of said last-mentioned rectangular wave output.

4. A system for generating three output signals in response to a carrier and a modulating frequency, comprising means for generating a carrier signal of rectangular wave shape, means for generating a modulating signal of rectangular wave shape, a balanced mixer, means for applying said modulating signal to said balanced mixer, means for applying said carrier signal to said balanced mixer and filter means for selecting at will one of a plurality of frequencies equal to the sum of said carrier frequency and said modulating frequency, and to the difference between said carrier frequency and said modulating frequency.

5. The combination in accordance with claim 4 wherein is provided means for generating said carrier signal and said modulating signal, comprising a common source of sinusoidal signal, and means for digitably counting down from the frequency of said common source of sinusoidal signals to the frequencies of said carrier signal and said modulating signal.

6. In a system for generating a plurality of output signals of precisely related frequencies and free of jitter, a stable source of oscillations of frequency $3f_0$, a squaring circuit in cascade with said source of oscillations of frequency $3f_0$, at least two channels connected in cascade with said squaring circuit, one of said channels including a binary divide by three circuit to provide a rectangular wave of frequency $f_0$, another of said channels including a binary chain including binary dividers and multipliers arranged to provide further rectangular wave outputs of frequencies $f_0/X=0.12f_0$, $0.06f_0$, $0.03f_0$, $0.015f_0$ and $0.034f_0$, a mixer having two input terminals and an output terminal, means for connecting said rectangular wave of frequency $f_0$ to one of said input terminals, means for connecting a selected one of said further rectangular wave outputs to the other of said input terminals, a filter tunable selectively to any one of frequencies $$f_0 \pm \frac{f_0}{X}$$

and means for connecting said filter in cascade with said output terminal.

7. The combination according to claim 6, wherein said mixer is a balanced mixer.

8. In a system for generating a plurality of output signals of precisely related frequencies which are free of jitter, a stable source of oscillations of frequency $f_0$, means for deriving from said stable source of oscillations of frequency $f_0$ further oscillations of frequency $f_0/n$, where $n$ is an integral division factor, said last means including at least one binary divider, means for deriving from said stable source of oscillations other oscillations of frequency $$\frac{f_0}{m}$$

where $m$ is an integral division factor, said last means including at least one binary division device, a mixer responsive to said further oscillations of frequency $$\frac{f_0}{n}$$

and said other oscillations of frequency $$\frac{f_0}{n}$$

for deriving heterodyne products of said further oscillations and said other oscillations, and filter means for selecting one of said products of conversion at will.

9. The combination according to claim 8, wherein said mixer is a balanced mixer.

10. In a system for generating a plurality of output signals of precisely related frequencies which are free of jitter, a stable source of oscillations of frequency $nf_0$, where $n$ is an integer, a squaring circuit in cascade with said source of oscillations of frequency $nf_0$, at least two channels connected in cascade with said squaring circuit, one of said channels including a binary divide by $n$ circuit to provide a rectangular wave of frequency $f_0$, another of said channels including a binary chain including binary dividers arranged to provide further plural rectangular wave outputs of frequencies $f_0/X$, where X has integer values only, a balanced heterodyne mixer having two input terminals and an output terminal, means for connecting a selected one of said further plural rectangular wave outputs to one of said input terminals, means for connecting said rectangular wave of frequency $f_0$ to the other of said input terminals, a filter tunable selectively to any one of said frequencies $$f_0 \pm \frac{f_0}{X}$$

and means for connecting said filter in cascade with said output terminal.

References Cited in the file of this patent

UNITED STATES PATENTS

| | | |
|---|---|---|
| 2,383,005 | Marks | Aug. 21, 1945 |
| 2,445,664 | Doelz | July 20, 1948 |